United States Patent [19]

Gallichan

[11] Patent Number: 4,568,020
[45] Date of Patent: Feb. 4, 1986

[54] ANTI-SKID DEVICE FOR MOTOR VEHICLES

[76] Inventor: Réjean Gallichan, 355 Cormier St., Drummondville, Canada, J2C 2N3

[21] Appl. No.: 605,223

[22] Filed: Apr. 30, 1984

[51] Int. Cl.⁴ .............................................. E01B 23/00
[52] U.S. Cl. ..................................................... 238/14
[58] Field of Search ........................ 238/14; D12/154; 152/208, 213 R; 404/35, 36

[56] References Cited

U.S. PATENT DOCUMENTS

| | | | |
|---|---|---|---|
| 2,248,537 | 7/1941 | Libbey | 238/14 |
| 2,443,319 | 6/1948 | Mack | 238/14 |
| 3,069,090 | 12/1962 | Ginsberg | 238/14 |
| 3,279,700 | 10/1966 | Britschgi | 238/14 |
| 3,858,803 | 1/1975 | Gantert | 238/14 |
| 3,910,491 | 10/1975 | Ducharme | 238/14 |

FOREIGN PATENT DOCUMENTS

| | | | |
|---|---|---|---|
| 0497332 | 11/1953 | Canada | 152/213 R |
| 1018203 | 9/1977 | Canada | 238/14 |
| 1135297 | 9/1982 | Canada | 238/14 |
| 0286006 | 7/1915 | Fed. Rep. of Germany | 238/14 |

*Primary Examiner*—Robert B. Reeves
*Assistant Examiner*—Dennis C. Rodgers

[57] ABSTRACT

A series of U-shaped frames have their web and legs of progressively greater length. A smaller-size frame fits between and is pivoted to the free ends of the legs of the next larger-size frame. When the device is extended, each frame projects outwardly from an adjacent frame. In folded position, each frame nests within the next larger frame. At least some of the frames have ground-engaging teeth and the smaller-size frame has tire-engaging teeth.

6 Claims, 5 Drawing Figures

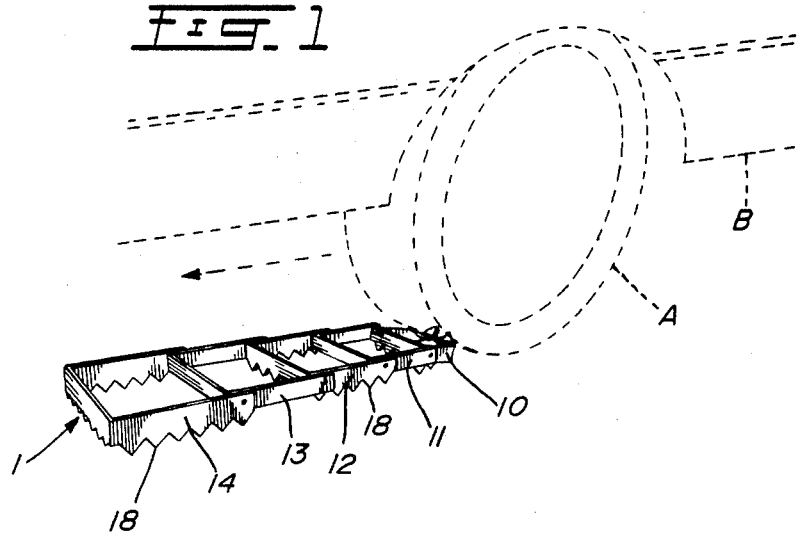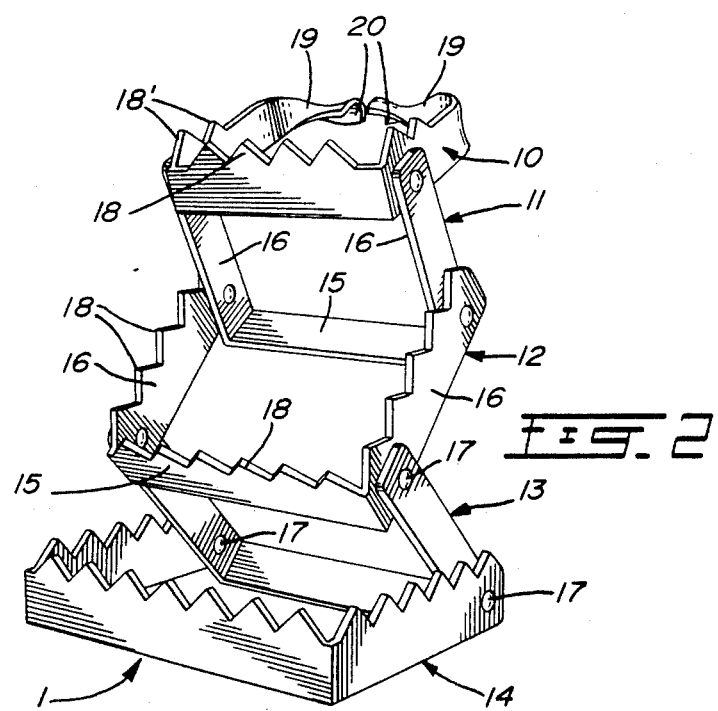

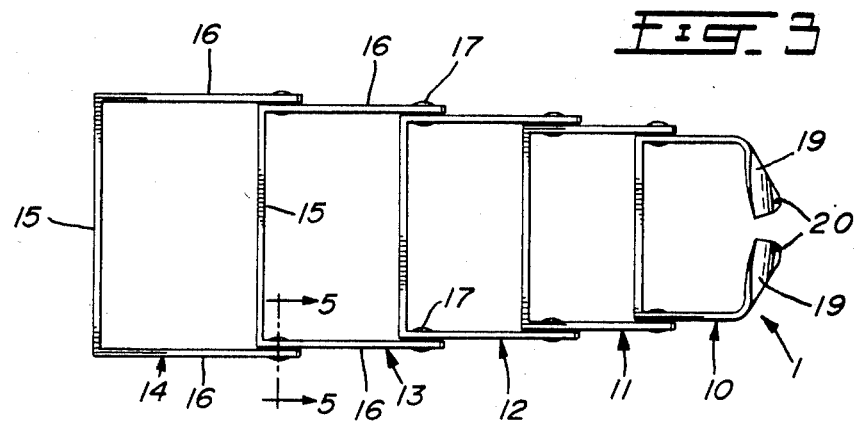
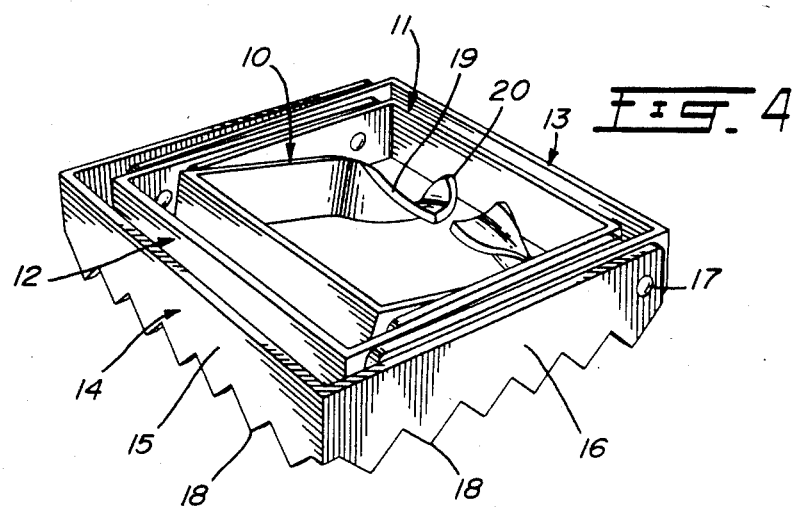
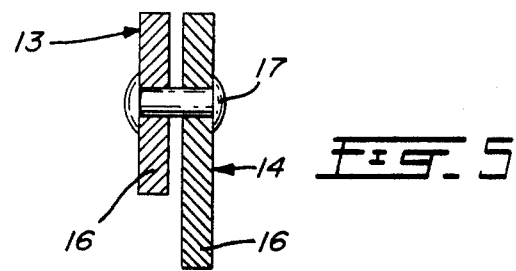

ANTI-SKID DEVICE FOR MOTOR VEHICLES

FIELD OF THE INVENTION

The present invention relates to an improved foldable anti-skid device for use under the tires of motor vehicles.

BACKGROUND OF THE INVENTION

Anti-skid devices of rigid unitary construction are well known and they are designed to be placed on the ground adjacent and under the stuck vehicle drive wheel to provide a tractive surface for the wheel. Such devices are normally carried in the vehicle trunk of the motor vehicle when not in use to be readily available whenever the vehicle is stuck. They require relatively large storage space. Moreover, they can damage other objects or persons, since they have exposed pointed teeth and are liable to be thrown out by the rotating wheel.

Canadian Pat. No. 1,135,297 dated Nov. 9, 1982, in the name of Richard Mantion and Jean-Paul Normandeau, and entitled: FOLDABLE TRACTION MAT FOR MOTOR VEHICLES, proposes an anti-skid device which can be folded when not in use to take a minimum storage space. This device consists of a plurality of twisted bars pivoted to one another in a lazy tongue arrangement. This device is expensive to manufacture and has insufficient traction, especially on ice, since it tends to fold up under the wheel. The device also often breaks under the weight of the vehicle when bridging a ground depression.

OBJECTS OF THE INVENTION

It is therefore the main object of the present invention to provide a foldable anti-skid device which is of very simple and inexpensive construction, which takes a minimum of room when folded, which provides efficient traction, since it fits the ground contour, and yet will not cause injury to persons or damage adjacent objects when used under the car and/or handled in a storage place, and will not damage the tire of the driving wheel.

Another object of the invention is to provide a device of the character described, which can be made from a minimum of material and which resists breakage in use.

SUMMARY OF THE INVENTION

The anti-skid device of the present invention comprises a series of U-shape frames, each having a pair of legs interconnected by a transverse web, the webs and legs of successive frames having progressively greater lengths. A smaller-size frame fits between and is pivoted to the free ends of the legs of the next larger-size frame, such that the frame can be folded from an extended operative position to a non-operative position, wherein each frame nests within the next larger-size frame. At least one of the frames have ground-engaging teeth and one of the end frames has tire-engaging teeth. Preferably, the tire-engaging teeth are disposed along the centerline of the extended device. Preferably, only each alternate frame is provided with ground-engaging teeth. Preferably, each U-shaped frame is made of flat bar steel stock with the legs bent at right angles to the web and the ground-engaging teeth are formed along a narrow edge of the frame and co-extensive with both legs and web.

BRIEF DESCRIPTION OF THE DRAWINGS

The foregoing will become clearer by referring to the drawings, in which:

FIG. 1 is a perspective view of the anti-skid device shown in operative extended position on the ground, with the tire-engaging teeth about to engage underneath the tire tread of a driving wheel of a motor vehicle;

FIG. 2 is a perspective view of the device in partially-folded position;

FIG. 3 is a top plan view of the device in a fully-extended position;

FIG. 4 is a perspective view of the device in fully-folded position; and

FIG. 5 is a cross-section taken along line 5—5 of FIG. 3.

DETAILED DESCRIPTION OF THE INVENTION

The anti-skid device of the present invention is generally shown at 1 and is designed to be laid on snow or ice-covered ground forwardly of and in engagement with the tread of tire A of the driving wheel of a motor vehicle B, so that the driving wheel which is stuck because in a rut or on a slippery surface, will roll over the device 1 which provides sufficient traction.

The device 1 is made of a series of at least three, for instance, five, U-shaped frames of progressively-increasing sizes, namely: frames 10 to 14. Each frame is made of flat bar metal-stock, preferably steel, bent to form a U-shape defining a web member 15 and two straight legs 16 at approximately right angles to the web 15 and of equal length. The webs and legs of successive frames of the series have progressively greater lengths. Therefore, a smaller-size frame fits between the legs of the next larger-size frame. All of the frames 10 to 14 are pivoted one to another. More particularly, the portion of the legs 16 of the smaller-size frame 10, adjacent its web 15, is pivoted to the free ends of legs 16 of the next larger-size frame 11 by means of riveted pivot pins 17 for pivotal movement of the two frames about an axis transverse to the device 1 and generally parallel to the webs 15 of all the frames. The successive frames are analogously pivoted to the next larger frame. Each frame can be pivoted with respect to the next larger frame through a complete turn.

From the foregoing, it is clear that the device 1 can be fully extended to an operative position, as shown in FIGS. 1 and 3, in which each frame projects outwardly from an adjacent frame and a folded inoperative position ready for storage in which each frame nests within the next larger-size frame, which all the frames in coplanar relationship, as clearly shown in FIG. 4, In the folded position, the device 1 makes a compact and neat bundle, which can be conveniently stored in minimum space. The flat bar stock constituting each frame is simply bent, as previously described, to form the side legs 16 and is not twisted in any way. Each frame is adapted to lie flat on the ground with a narrow edge of the flat bar stock in contact with the ground. This narrow edge is formed with a series of ground-engaging teeth 18, at least for each alternate frame. In the example shown, there is an odd number of frames and the odd-numbered frames of the series, namely the two end frames 10 and 14, as well as frame 12, are provided with such ground-engaging teeth 18. Each tooth is integral with the frame, being made by a die-cut operation to form contiguous teeth extending along substantially the complete length of legs 16 and web 15. Each tooth 18 has an apex angle of about 90°. Because they extend over the entire length of the frame, the teeth provide very efficient traction on ice or slippery snow.

It has been found unnecessary to provide ground-engaging teeth 18 on all of the frames. Preferably, the even-numbered frames of the series are devoid of such teeth (see frames 11 and 13). With this arrangement, when the tire A rests on a web 15 devoid of ground-engaging teeth 18 the pressure is transmitted through the pivot pins 17 to the legs 16 of the next larger-size frame, which is itself provided with ground-engaging teeth 18. Thus, sufficient traction is obtained for any position of the tire wheel on the device 1. Due to the pivotal connections between the frames, very efficient traction is obtained, even if the ground is not flat but contoured, since each frame pivots to lie flat on the ground.

Preferably, each frame provided with ground-engaging teeth 18, is formed as follows:

A flat bar stock, of twice the width of the U-shape frame and of the required length, is die cut along its longitudinal centerline to form interdigitated teeth 18 for two similar frames. Then these two frames are bent to form the web 15 and right angular legs 16, each adapted to form one frame of one device 1. Thus, a saving of steel material is obtained.

Th smallest-size U-shape frame 10 is further provided at the free ends of its legs 16 with inturned extensions 19, which practically touch each other at their free ends located along the longitudinal centerline of the device 1, these free ends being twisted and shaped to form tire-engaging teeth 20 which are directed opposite to the ground-engaging teeth 18 and 18' of this frame 10. Furthermore, the teeth 18' of legs 16 of frame 10 do not extend the full length of these legs, but only along the portion adjacent the web 15. In the embodiment shown, there are two such teeth 18' on each leg 16 of frame 10 with the tooth further away from pivot 17, being of slightly smaller height. With this arrangement, the outer portion of the frame 10 is of minimum thickness for maximum insertion underneath the tire A for proper engagement of the teeth 20 with the tire tread, so that immediately upon start of rotation of the tire A, the latter will move over the device 1.

The free ends of the two extensions 19 of frame 10 can be welded to each other, but this has not been found necessary.

Because the two teeth 20 are centrally located, non-simultaneous engagement of these teeth by the tire A will not result in the lateral shifting and misalignment of the device A with respect to the direction of movement of the tire A, contrary to what could happen if these teeth 20 were spaced apart transversely of the frame 10.

Preferably, the device is folded in accordeon-like fashion, as shown in FIG. 2, so that all the ground-engaging teeth will face in the same direction when the device is in folded and unfolded position. The tire-engaging teeth 20 (see FIG. 4) lie at a lower level than the other frames.

A pair of such folded devices or units can be stored with the ground-engaging teeth of each unit facing the teeth of the other unit, one unit upside down with the ground-engaging teeth facing upward and the other unit with the ground-engaging teeth facing downward, and the transverse teeth of both units interdigitated. The ground-engaging teeth on one side of one unit, namely: on frames 14, 12, and 10, will engage into the space formed by the side legs 16 of frames 13 and 11 with an offset equal to the thickness of the flat bar stock constituting U-shape frames. This stored arrangement of both units provides a smooth surface all around the folded pair, which will not cause damage to fabric or any other material which might rest on top or underneath the folded pair. Also, the overall thickness is reduced.

What I claim is:

1. A foldable anti-skid device for use under the tire of a motor vehicle driving wheel, comprising at least three U-shaped frames in series, each having a pair of legs interconnected by an integral transverse web, the webs and legs of successive frames of said device having progressively greater lengths, a smaller-size frame fitting between the next larger-size frame, the portion of the legs of a smaller-size frame adjacent the web of said smaller-size frame freely pivoted to the free ends of the legs of the next larger-size frame for free pivotal movement of all the frames relative to each other about axes substantially parallel to said webs between an extended position of the device in which each frame projects outwardly from an adjacent frame and a folded position of the device wherein all the frames are folded in accordion-like fashion one relative to the next one, and wherein each frame nests within and is substantially contiguous with the next larger-size frame, with all said frames in substantially co-planar relation, said frames, when said device is in extended position, having a ground-engaging side, ground-engaging teeth formed at said ground-engaging side of at least the two end frames of said series and the smaller-size frame having tire-engaging teeth oppositely directed relative to said ground-engaging teeth, said tire-engaging teeth being wholly confined within the next larger frame in the folded position of the device.

2. A device as claimed in claim 1, wherein each frame is made of flat bar metal stock with said legs bent at substantially right angles to said web, said ground-engaging teeth being integral with their associated frame and formed at a narrow side edge of said flat bar stock said teeth being contiguous and having an apex angle of about 90°.

3. A device as defined in claim 2, wherein said ground-engaging teeth extend along the web and legs of their associated frame.

4. A device as defined in claim 3, wherein, the free ends of the smaller-size end frame have inturned extensions directed towards each other and terminating adjacent each other along the longitudinal centerline of the device said free ends of said extensions being twisted and shaped to each provide one of said tire-engaging teeth.

5. A device as defined in claim 4, wherein the web and only the portion of the legs of the smaller-size end frame adjacent its web are provided with ground-engaging teeth, the outer portion of the legs of said end frame being free of said teeth.

6. A device as claimed in claim 1, wherein there is an odd number of frames in the series and said ground-engaging teeth are provided of all odd numbered frames of the series with the remaining even numbered frames being devoid of said teeth.

* * * * *